(No Model.)

J. V. BAIRD.
Gate.

No. 235,489. Patented Dec. 14, 1880.

Witnesses.
M. M. Converse
Ora Converse

Inventor:
John V. Baird
By B. C. Converse, Atty.

N. PETERS, PHOTO-LITHOGRAPHER, WASHINGTON, D. C.

UNITED STATES PATENT OFFICE.

JOHN V. BAIRD, OF SPRINGFIELD, OHIO.

GATE.

SPECIFICATION forming part of Letters Patent No. 235,489, dated December 14, 1880.

Application filed June 3, 1880. (No model.)

*To all whom it may concern:*

Be it known that I, JOHN V. BAIRD, of Springfield, in the county of Clarke and State of Ohio, have invented a new and useful Improvement in Gates, of which the following is a specification.

My invention relates to an improvement in gates which open and close by means of levers, rods, &c., operated by the wheels of the carriage in passing over bell-crank levers on either side of the gate connected with the system of levers, rods, &c., under the ground surface. It differs from gates operated in a like manner, first, in opening the two gate-sections by separating them from each other by a slide movement and closing them in the same way instead of swinging them open, as in the pivoted or hinged gates.

The object of my improvement is to simplify the mechanism and to render the operation less difficult and expensive, and also to provide for operating a self-closing gate upon a hillside or in places where the uneven ground will not admit of a swinging or pivoted gate being used, having the series of levers, cranks, &c., for opening gates by driving over the crank-rods. To accomplish this I construct my two gate-sections with trundle-rollers under the end bars, which run on a guide-rail placed across the roadway. I also place two supporting-posts, one on each side of the gate-sections. To keep the sections in position there are flanged wheels pivoted at the top of the posts on one side, upon which the section rides. A groove admits the flange of the wheel, acting as a top guide for the sections and a support while being shifted. An upright lever (more or less inclined with the movement) is pivoted beneath the ground surface on one side of each section, in close proximity thereto, so as to have a radial movement in the same plane with that of the sections. These levers extend above the middle rail through loops or slotted plates fastened thereto, and as they move in opposite directions open and close the sliding sections. Their lower ends are connected with the system of rods, levers, &c., beneath the ground surface, which will be hereinafter more fully described.

Figure 1:
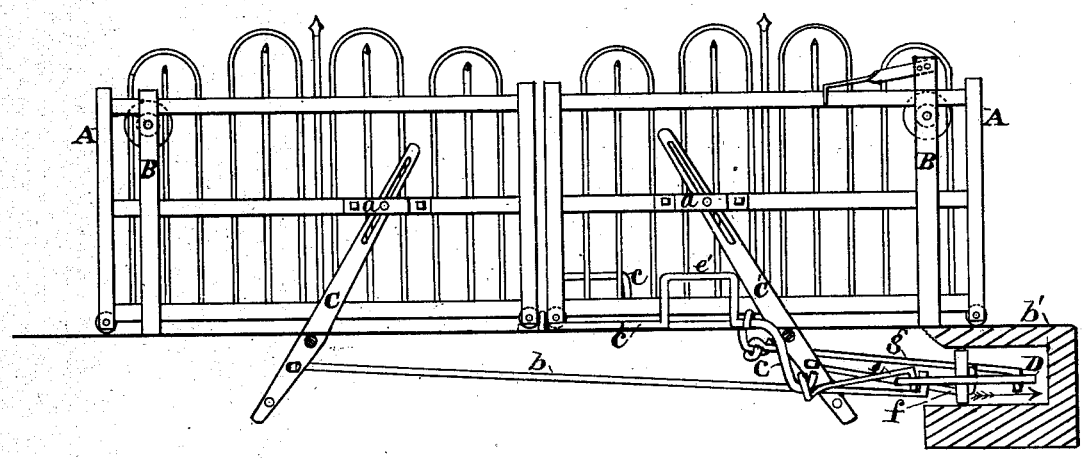
Figure 2:
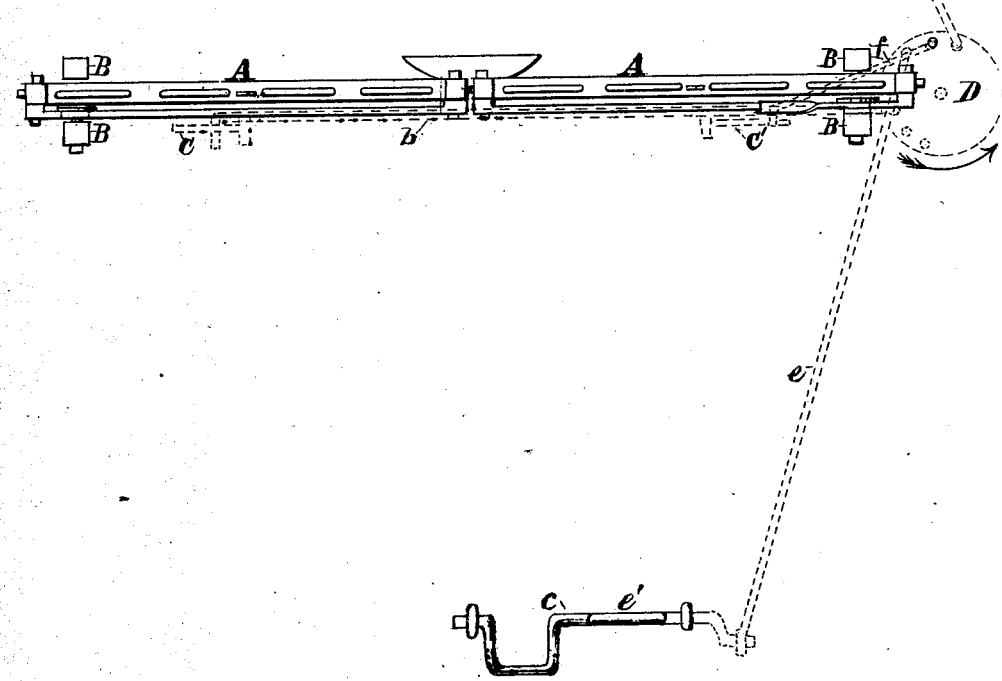

Figure 1 is a side elevation of my improved gate; Fig. 2, a plan view of the same.

A A are the gate-sections; B, the posts; C C', the inclined operative levers directly connected with the sections.

The upper end of levers C C' passes through loop *a* on the middle rail. It is slotted to receive a pin inserted centrally through the loop, to allow the lever to operate without binding and to prevent the section from being removed. When the gate is closed levers C C' incline inward toward each other, and when opened they are thrown in opposite directions, the distance of separation of the two gate-sections being regulated by the throw of the levers. They are pivoted far enough apart to allow sufficient passage-way between the sections when open. Their lower ends have a series of holes in them for regulating the distance required for their movement.

As seen in Fig. 1, a long rod, *b*, having a hook on each end, connects the lever seen on the left with a vertically-pivoted wheel, D, beneath the ground surface, in a timbered box, *b'*, under the right end of the gate. This wheel forms the intermediate connection with all the levers used in opening and closing the gate. By reference to Fig. 2 it will be seen (in dotted lines) that it is pierced with a series of holes near its periphery, in order to readily adjust the movements of the levers or hook-rods attached to it.

*c c* are crank-rods, or "wheel-irons," as they are often called on account of the wheel striking them and turning the part *e'* (which stands up) down upon the ground, operating the rod connected therewith, the wheel D, and the levers or rods *e f* C C', to open and close the gate.

In opening the gate (closed as seen in Fig. 1) the carriage-wheel strikes the bend *e'* of lever or crank-rod *c*, (in going toward the gate,) pushes it forward and downward upon the ground, the right end of *c* being extended, as seen, below the surface, having nearly a right-angled bend, and connecting by a hook with rod *e*. The latter is drawn forward toward *c*. This movement turns the wheel D in the direction of the arrow, pushing lever C', (with rod *f*, connecting it with the wheel,) and pulling on rod *b* at the same time, thus reversing the position of levers C C' and throwing the gate-sections apart. The same movement extends rod g, connected with the crank-rod on the opposite side of the gate, partially rotating it toward the gate, and throwing up the bend on its right end, ready to receive the carriage-wheel, which pushes it down and closes the gate, as before. The operation of these crank-rods and their connections with the common swing-gate is well known, and as the operation of the one placed upon each side is essentially the same, a more complete plan view is not deemed necessary, the entire movement and connection on one side being shown.

The crank-rods, being old and well-known devices, are not claimed. The sliding gate-sections and the series of connecting-rods, when separately considered, are also old; but the combination of the intermediate adjustable wheel with the several elements which are used is believed to be new.

I therefore claim—

1. In sliding gates operated by mechanism beneath the ground surface, the combination, with the pivoted levers C C', crank-rods c c, and the series of rods b e f g, of the intermediate adjustable wheel, D, and gate-sections A A', as hereinbefore set forth.

2. In sliding gates supported partially upon friction-wheels pivoted upon the guide-posts of the same, the pivoted levers C C' and plates a, in combination with the system of crank-rods, hook-rods, levers, and the intermediate adjustably-connected wheel, D, as heretofore described, for the purpose set forth.

JOHN V. BAIRD.

Attest:
  B. C. CONVERSE,
  M. H. SHEABOR.